(12) United States Patent
Chen

(10) Patent No.: US 9,931,978 B1
(45) Date of Patent: Apr. 3, 2018

(54) WARNING SIGN STRUCTURE FOR VEHICLE

(71) Applicant: Sheng-Fa Chen, New Taipei (TW)

(72) Inventor: Sheng-Fa Chen, New Taipei (TW)

( * ) Notice: Subject to any disclaimer, the term of this patent is extended or adjusted under 35 U.S.C. 154(b) by 0 days.

(21) Appl. No.: 15/407,796

(22) Filed: Jan. 17, 2017

(51) Int. Cl.
*B60Q 7/00* (2006.01)
*B60Q 1/52* (2006.01)

(52) U.S. Cl.
CPC .................... *B60Q 1/52* (2013.01)

(58) Field of Classification Search
CPC ..... B60Q 1/52; B60Q 7/00; F21L 7/00; F21S 4/02
USPC .... 340/473, 471, 815.45; 362/233, 109, 184
See application file for complete search history.

(56) References Cited

U.S. PATENT DOCUMENTS

| | | | |
|---|---|---|---|
| 5,980,070 A * | 11/1999 | Hulse | B60Q 1/2657 362/294 |
| 7,145,449 B2 * | 12/2006 | Kim | B60Q 1/2665 340/463 |
| 2012/0235810 A1 * | 9/2012 | McMeekin | B60Q 1/2657 340/473 |

FOREIGN PATENT DOCUMENTS

| | | |
|---|---|---|
| TW | M319866 U | 10/2007 |
| TW | M434701 U | 8/2012 |

* cited by examiner

*Primary Examiner* — Toan N Pham
(74) *Attorney, Agent, or Firm* — Muncy, Geissler, Olds & Lowe, P.C.

(57) ABSTRACT

A warning sign structure includes an activating mechanism and a stretching-retracting mechanism movably joined to the activating mechanism. The stretching-retracting mechanism includes a retractable unit connected to the activating mechanism and a light emitting unit movably disposed on a top of the retractable unit. When the vehicle breaks down, the activating mechanism drives a stretching-retracting mechanism to stretch its retractable unit to an appropriate height manually or automatically and turns on a light emitting unit. The light emitting unit emits light in a high position to warn the rear-coming vehicles. The driver can also detach the stretching-retracting mechanism and use the stretching-retracting mechanism as a hand-held warning sign or a traffic baton.

5 Claims, 6 Drawing Sheets

WARNING SIGN STRUCTURE FOR VEHICLE

BACKGROUND OF THE INVENTION a) Field of the Invention

The present invention relates to a warning sign structure for vehicles, and more particularly to a warning sign structure including a retractable unit which stretches out manually or automatically and turns on a light emitting unit when vehicles breakdown so that the light emitting unit emits light in a higher position to warn rear-coming vehicles, and thus drivers need not to get off his/her vehicle to place warning signs on a road, and traffic accidents are thus prevented. In addition, the driver can also detach a stretching-retracting mechanism from an activating mechanism and uses the stretching-retracting mechanism as a hand-held warning sign or a traffic baton. The warning sign structure of the invention is simple and can be easily operated, mounted and maintained. The warning sign structure of the invention has wide application.

b) Description of the Prior Art

Accordingly, according to traffic rules, a vehicle which must leave the lane and stay in the shoulder for help when it breaks down. At this time, warning lamps of the vehicle must be turned on and a warning sign must be placed at 100 meters behind the vehicle to warn vehicles coming from its rear side.

However, typical warning sign is a triangular sign which can be placed on the ground. The triangular sign often has not enough height so that rear-coming vehicles often pay no attention to it. To solve such a problem, Taiwan patent No. M319866 discloses an improved warning lamp structure for vehicles which solves the described height problem of the typical warning sign. However, the improved warning lamp structure of M319866 still have to be placed on the ground, and thus traffic accidents may happen when the driver gets off his/her vehicle to place the warning sign on the ground.

Therefore, Taiwan patent No. M434701 discloses a floating warning sign for vehicle which solves the described height problem of the typical warning sign and the placement problem of M319886. However, when wind becomes strong in the outer environment, the bag of M434701 is possibly carried by the wind to under the vehicle or some lower place or just flies with the wind so that drivers of the rear-coming vehicles cannot effectively determine the position of the broken-down vehicle. The bag is filled with some gas of a density lower than air, such as helium or nitrogen. When the amount of gas in the bag is not enough, the bag cannot float in the air. On the contrary, when the amount of gas in the bag is too much, the bag may break. Since the gas filling unit of the floating warning sign of M434701 needs a better precision to control the gas amount, it often has a complicated structure and thus is not easily to be mounted or maintained.

SUMMARY OF THE INVENTION

An object of the invention is to improve the drawbacks of the conventional warning signs. The invention provides a warning sign includes an activating mechanism which is mounted in an appropriate position of a vehicle and connected to a battery of the vehicle. When the vehicle breaks down, the activating mechanism drives a stretching-retracting mechanism to stretch its retractable unit to an appropriate height manually or automatically and turns on a light emitting unit. The light emitting unit emits light in a high position to warn the rear-coming vehicles so that the driver of the vehicle need not to get off his/her vehicle to place a warning sign on the ground and some accidents are thus prevented. In addition, the driver can also detach the stretching-retracting mechanism from the activating mechanism and use the stretching-retracting mechanism as a hand-held warning sign or a traffic baton. The warning sign structure of the invention is simple and can be easily operated, mounted and maintained. The warning sign structure of the invention has wide application.

To achieve the abovementioned needs and purposes, a warning sign structure for a vehicle is disclosed in the present invention. The warning sign structure includes an activating mechanism and a stretching-retracting mechanism movably joined to the activating mechanism. The stretching-retracting mechanism includes a retractable unit connected to the activating mechanism and a light emitting unit movably disposed on a top of the retractable unit.

It is preferably that the activating mechanism includes a driving unit connected to the retractable unit, a joining portion disposed on the driving unit and an electronic control unit connected to the driving unit.

It is preferably that the driving unit is a pneumatic cylinder, a hydraulic cylinder, a motor or an elastic member.

It is preferably that the joining portion is a magnetic body, adhesive or a bolt.

It is preferably that the electronic control unit includes a power supply cable and a setting switch.

It is preferably that the retractable unit comprises elastic metallic material or elastic non-metallic material, and the retractable unit can be circular, square or triangular.

It is preferably that the light emitting unit is a light emitting diode strip.

It is preferably that the driving unit includes a connecting socket, and the retractable unit includes a connector movably connected to the connecting socket.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
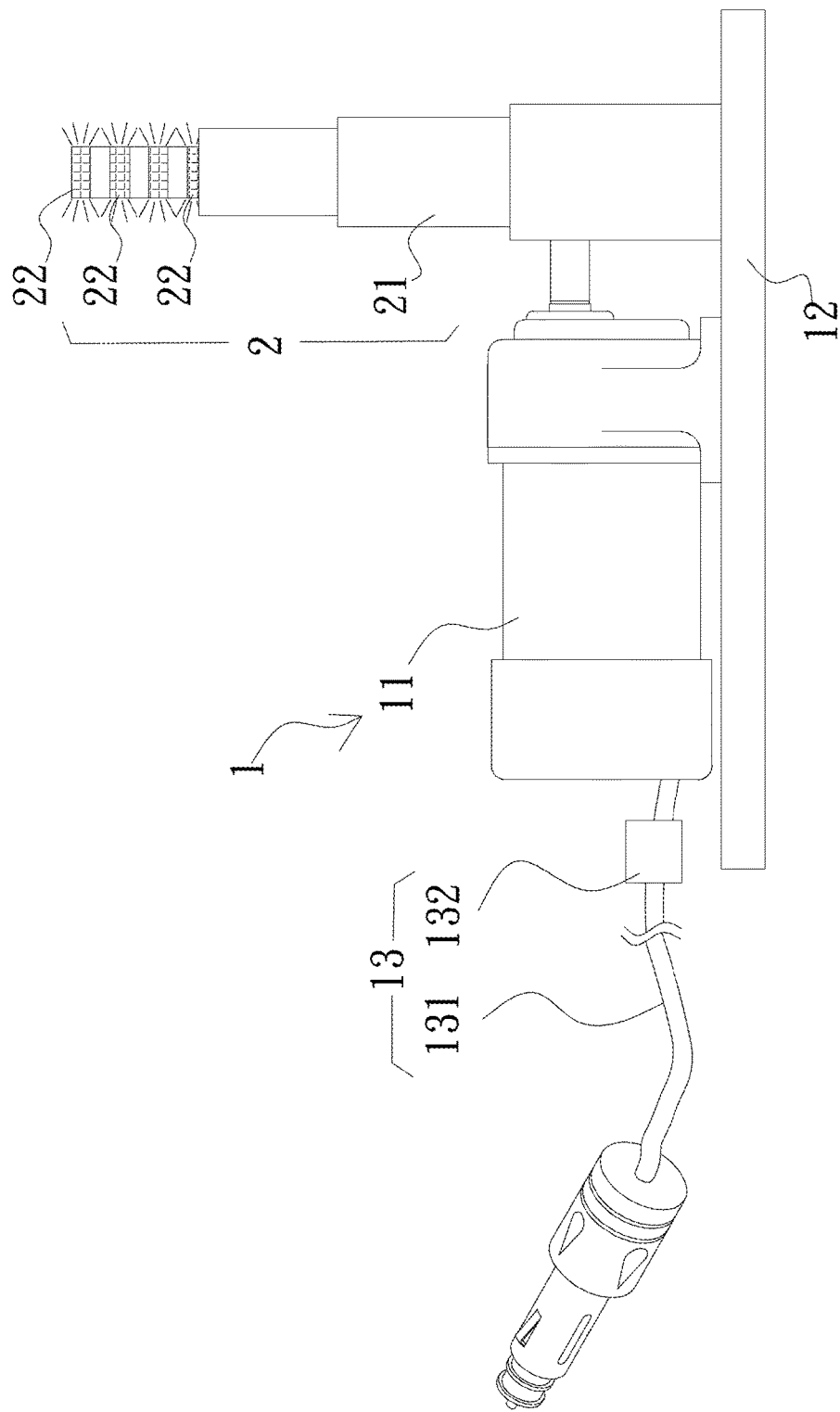
FIG. 1 shows a three-dimensional schematic view of a first embodiment of a warning sign structure of the present invention.
Figure 2:
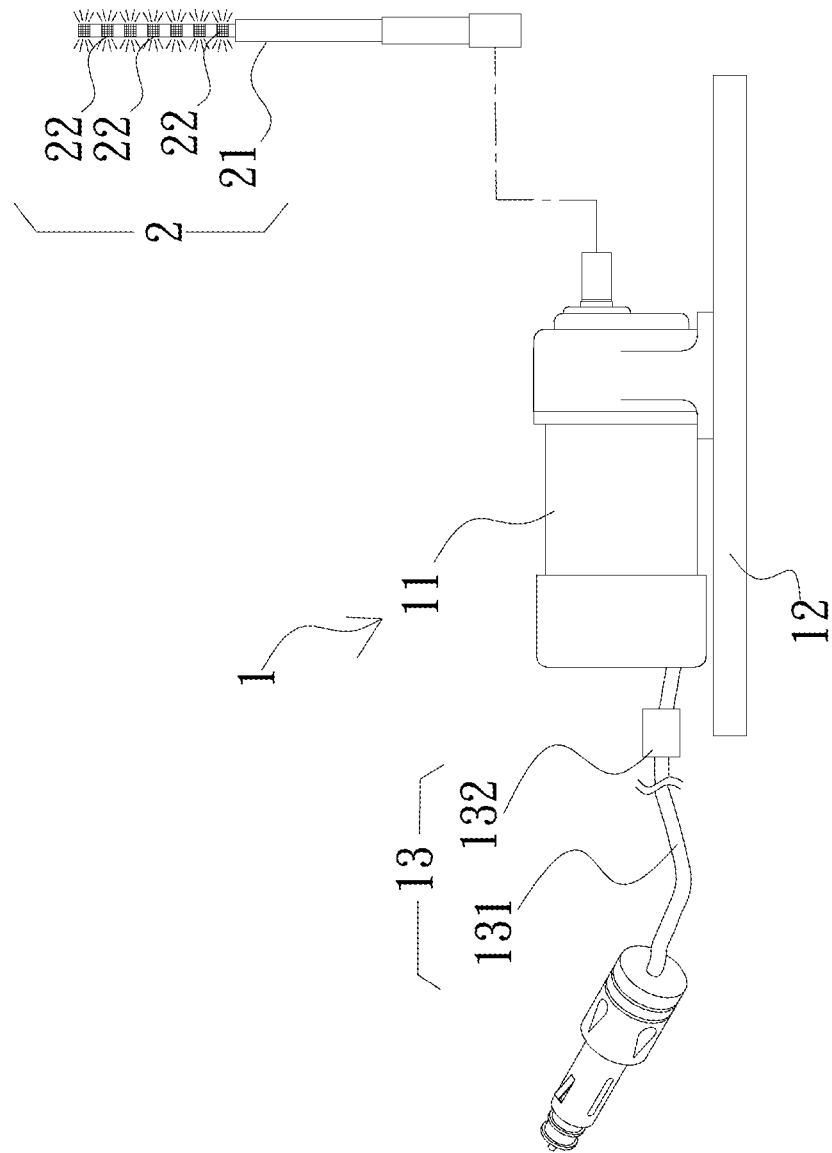
FIG. 2 shows a three-dimensional exploded view of the first embodiment of a warning sign structure of the present invention.
Figure 3:
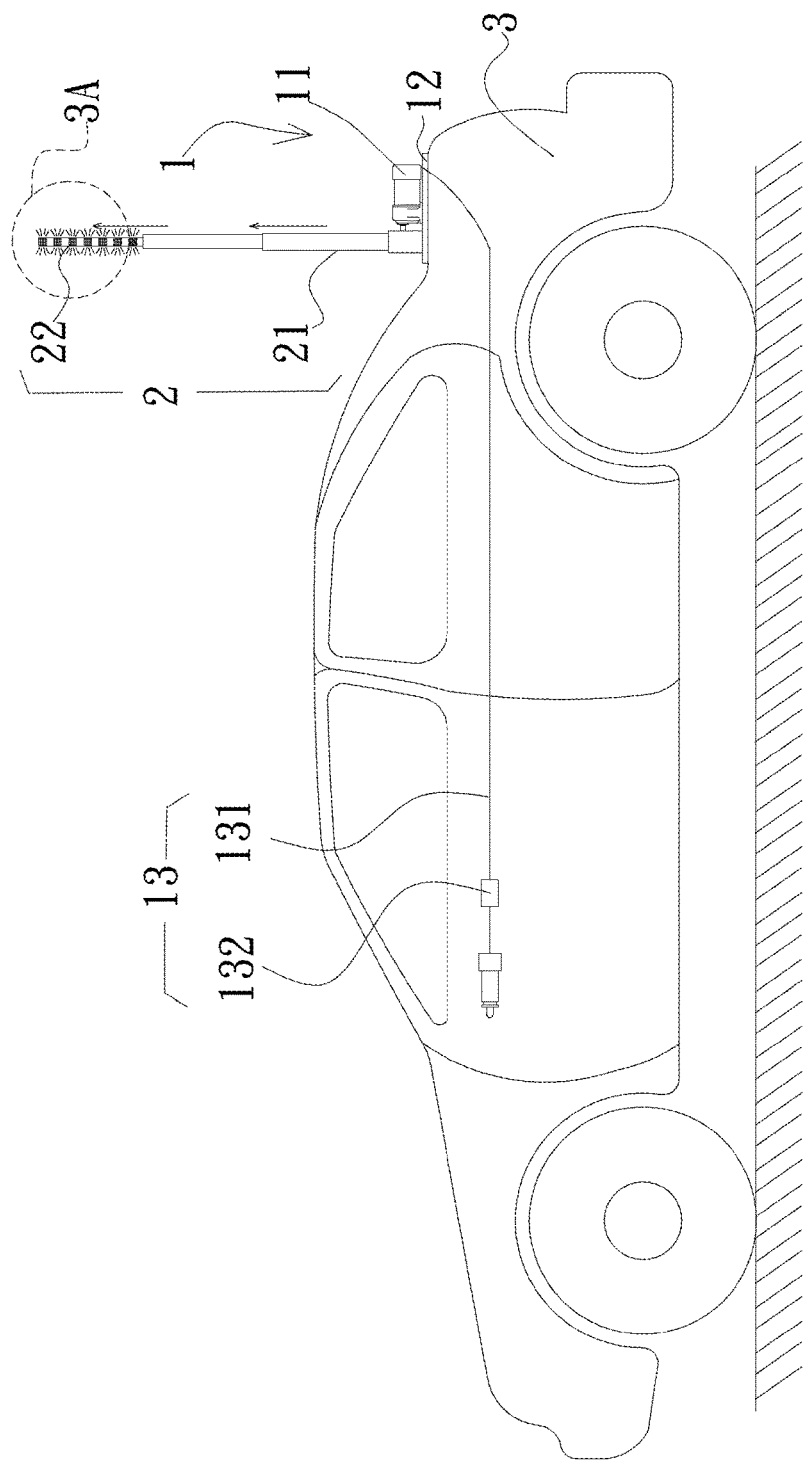
FIG. 3 shows a schematic view of an implementation state of the first embodiment of a warning sign structure of the present invention.
Figure 3A:
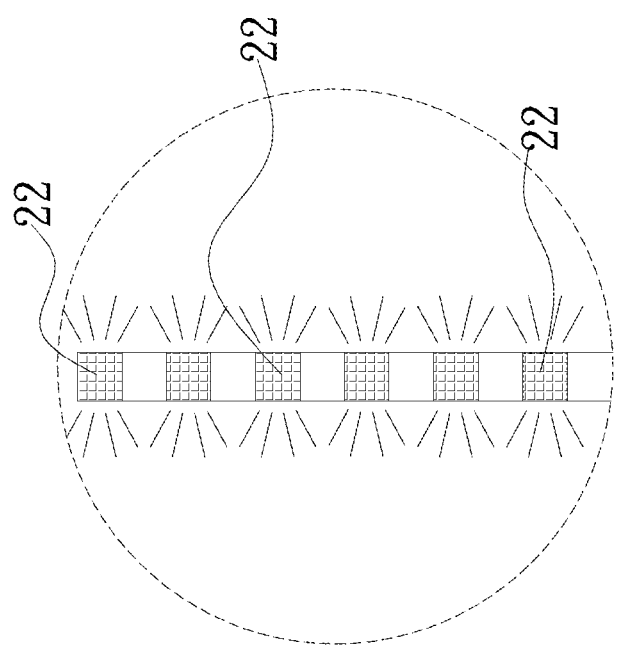
FIG. 3A is a partial enlarged schematic view of FIG. 3 of the first embodiment of a warning sign structure of the present invention.

Referring to FIG. 1, FIG. 2, FIG. 3 and FIG. 3A, a warning sigh structure for a vehicle of the present invention includes an activating mechanism 1 and a stretching-retracting mechanism 2.

The activating mechanism 1 includes a driving unit 11, a joining to portion 12 disposed on the driving unit 11 and an electronic control unit 13 connected to the driving unit 11. The driving unit 11 is a pneumatic cylinder, a hydraulic cylinder, a motor or an elastic member. The joining portion 12 is a magnetic body, adhesive or a bolt. The electronic control unit 13 includes a power supply cable 131 and a setting switch 132.

The stretching-retracting mechanism 2 is movably joined to the activating mechanism 1. The stretching-retracting mechanism 2 includes a retractable unit 21 connected to the driving unit 11 and a light emitting unit 22 disposed on a top of the retractable unit 21. The retractable unit 21 is made of elastic metallic material or elastic non-metallic material. The retractable unit 21 can be circular, square or triangular. The light emitting unit 22 is a light emitting diode strip.

When the warning sigh structure of the present invention is assembled, the activating mechanism 1 is mounted to a front portion (hood) or a rear portion (luggage compartment cover) of a vehicle through the joining portion 12 which is connected to the vehicle through magnetic, adhesive or bolt-engaging means. The power supply cable 131 of the electronic control unit 13 is connected to a battery of the vehicle or a socket of a cigarette lighter to access battery power of the vehicle. The setting switch 132 can be set to be manually or automatically operated or connected to a warning indicator or an air bag of the vehicle. Thus, the warning sign structure of the invention is simple and can be easily operated, mounted and maintained.

When the vehicle 3 breaks down or traffic accident happens, the driving unit 11 of the activating mechanism 1 is manually or automatically started according to the settings of the setting switch 132. The driving unit 11 drives the retractable unit 21 of the stretching-retracting mechanism 2 to stretch out. The light emitting unit 22 rises to an appropriate position higher than a roof of the vehicle 3 through the stretch of the retractable unit 21. The light emitting unit 22 is turned on to emit blinking light or continuous light. The light emitting unit 22 emits light in a higher position of the vehicle 3 to warn rear-coming vehicles so that the driver of the vehicle 3 needs not to get off his/her vehicle 3 for placing a warning sign on the ground when whether is poor, it gets dark or other conditions happen, and accidents are thus prevented. The warning sign structure of the invention which replaces the typical triangular warning sign is easily to operate and provides a warning for the rear-coming vehicles to avoid the broken-down vehicle earlier or rescue the broken-down vehicle quickly. Since the retractable unit 21 is to made of elastic metallic material or elastic non-metallic material, the retractable unit 21 can sustain external forces and is prevented to be broken when the retractable unit 21 is in use.

Figure 4:
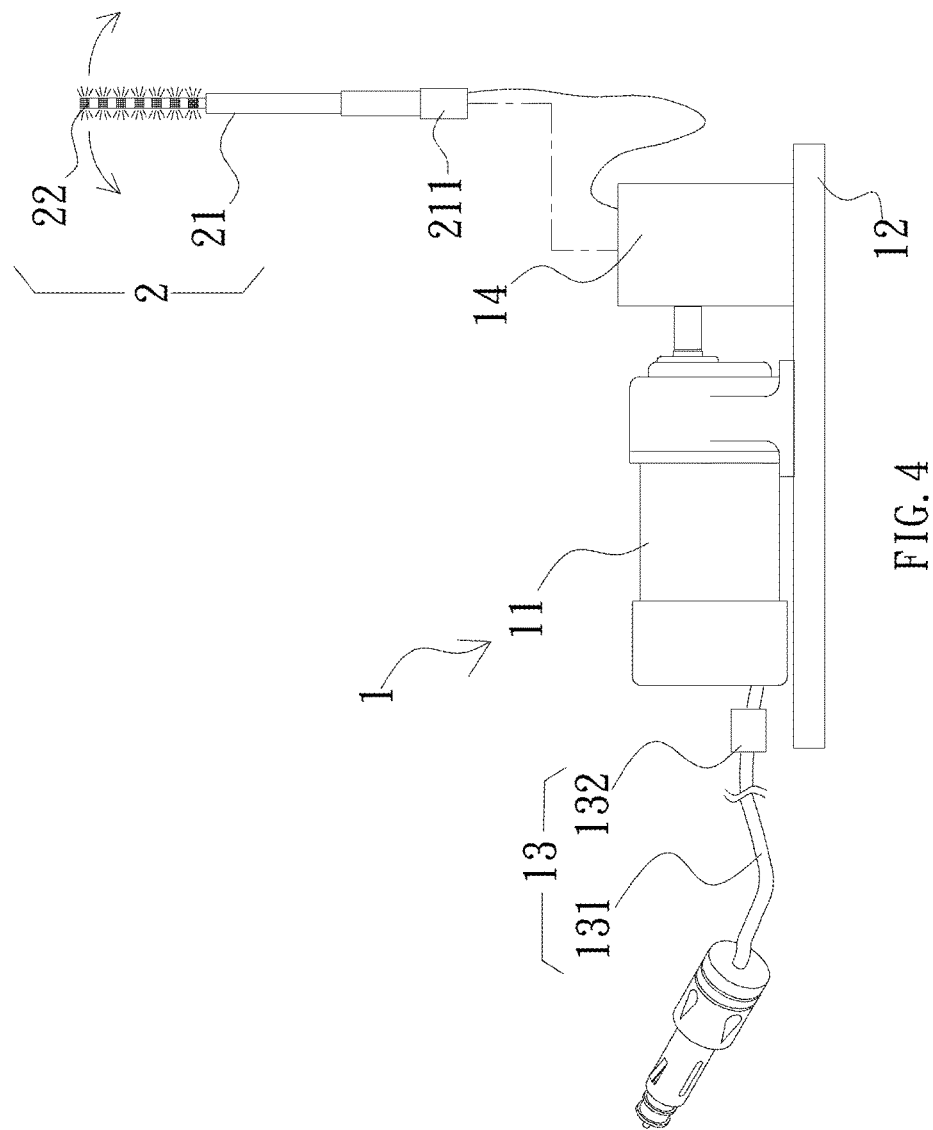
FIG. 4 shows a three-dimensional schematic view of a second embodiment of a warning sign structure of the present invention.
Figure 5:
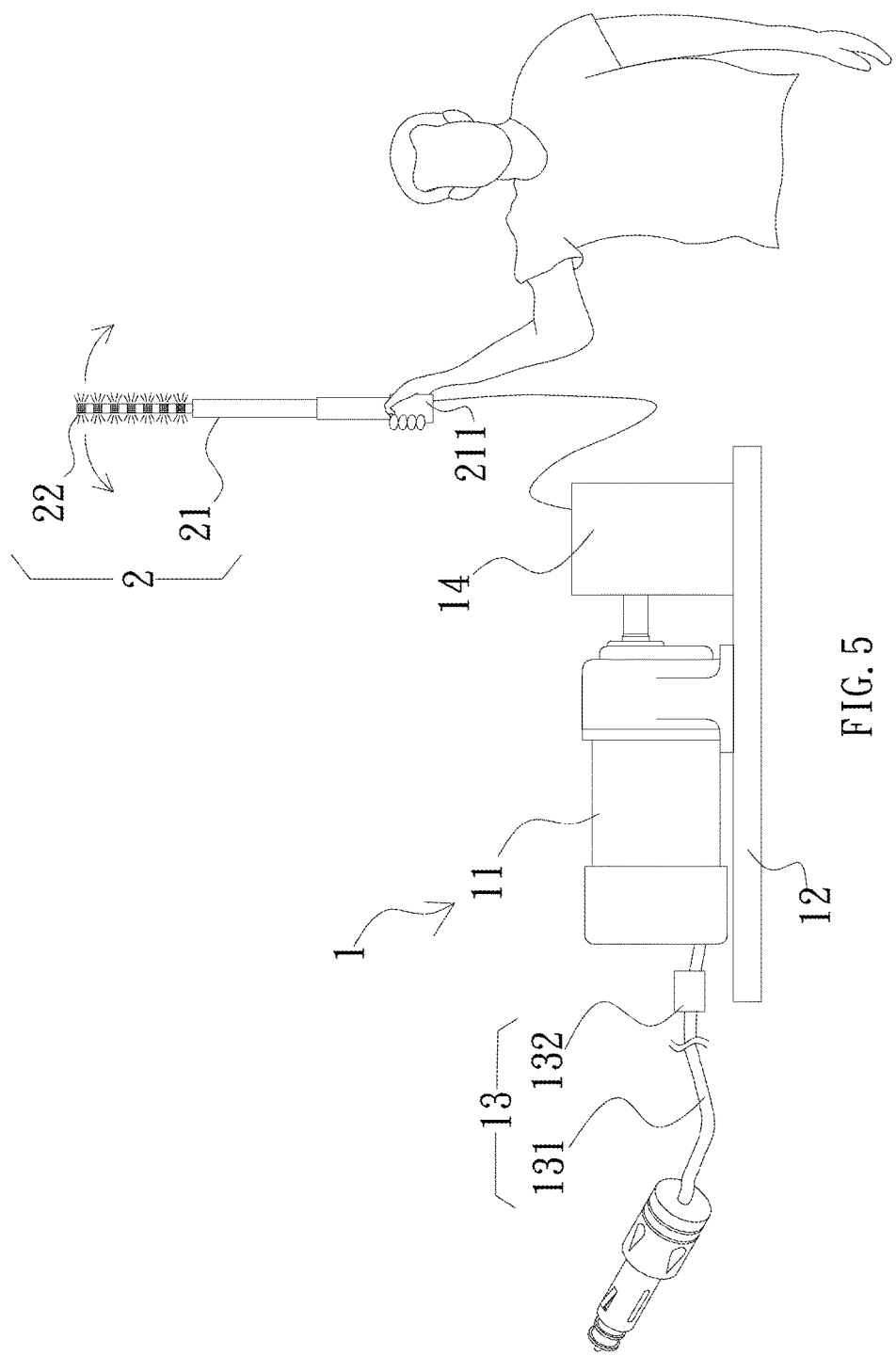
FIG. 5 shows a three-dimensional exploded view of the second embodiment of a warning sign structure of the present invention.

Referring to FIGS. 4 and 5, in addition to the first embodiment of the warning sign structure of the invention, a second embodiment of the warning sign structure of the invention is disclosed. The difference between the first embodiment and the second embodiment is that a connecting socket 14 is disposed on the driving unit 1 and a connector 211 is disposed in the retractable unit 21. The connector 211 can be detachably connected to the connecting socket 14.

The stretching-retracting mechanism 2 is detached from the activating mechanism 1 and used as a hand-held warning sign or a traffic baton.

The warning sign structure of the invention can improve the disadvantages of the conventional warning sign structure. The activating mechanism which is mounted in an appropriate position of a vehicle and connected to the battery of the vehicle. When the vehicle breaks down, the activating mechanism drives the stretching-retracting mechanism to stretch its retractable unit to an appropriate height manually or automatically and turns on the light emitting unit. The light emitting unit emits light in a high position to warn the rear-coming vehicles so that the driver of the vehicle needs not to get off his/her vehicle to place a warning sign on the ground and some accidents are thus prevented. In addition, the driver can also detach the stretching-retracting mechanism from an activating mechanism and use the stretching-retracting mechanism as a hand-held warning sign or a traffic baton. The warning sign structure of the invention is simple and can be easily operated, mounted and maintained. The warning sign structure of the invention has wide application. The invention is progressive and practical and can satisfy demands of users, and therefore has meet the basic requirements of patent application. The Applicant submits an utility application according to patent law.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A warning sign structure for a vehicle, comprising:
    an activating mechanism; and
    a stretching-retracting mechanism movably joined to the activating mechanism and including:
        a retractable unit connected to the activating mechanism; and
        a light emitting unit movably disposed on a top of the retractable unit,
    wherein the activating mechanism comprises:
        a driving unit connected to the retractable unit, the driving unit including a connecting socket;
        a joining portion disposed on the driving unit, the joining portion being a magnetic body, an adhesive or a bolt; and
        an electronic control unit connected to the driving unit,
    wherein the retractable unit includes a connector movably connected to the connecting socket.

2. The warning sign structure according to claim 1, wherein the driving unit is a pneumatic cylinder, a hydraulic cylinder, a motor or an elastic member.

3. The warning sign structure according to claim 1, wherein the electronic control unit includes a power supply cable and a setting switch.

4. The warning sign structure according to claim 1, wherein the retractable unit includes elastic metallic material or elastic non-metallic material.

5. The warning sign structure according to claim 1, wherein the light emitting unit is a light emitting diode strip.

\* \* \* \* \*